April 19, 1960

W. C. YOCUM 2,933,284

DIAPHRAGM PACKLESS VALVE

Filed Nov. 12, 1957

*INVENTOR.*
WILLIAM C. YOCUM

BY

*Christy, Parmelee & Strickland*

United States Patent Office 2,933,284
Patented Apr. 19, 1960

2,933,284

DIAPHRAGM PACKLESS VALVE

William C. Yocum, Scott Township, Allegheny County, Pa., assignor to Superior Valve and Fittings Company, Pittsburgh, Pa., a corporation of Pennsylvania Application November 12, 1957, Serial No. 695,684

1 Claim. (Cl. 251—278)

This invention relates to valves of the type in which a flexible diaphragm is used to seal the valve against leakage. Such valves are especially useful where high pressure gases are involved, as for example gas cylinders, but they may be used in various applications where the valve is a line valve or the pressures are relatively low.

In the present application I shall specifically show and describe a high pressure cylinder valve, but this is by way of illustration and not by way of limitation.

As now constructed, packless valves comprise a body with an inlet and outlet passage connection, and a ported partition separates the inlet and outlet sides. The partition has a raised seat around the discharge side of the port. The valve stem is above the seat and has a counterbore in its lower end in which a disk of plastic or other sealing material is set so that when the stem is forced down the disk will contact the seat to close the passage through the valve. The top of the valve stem is convex and a flexible metal diaphragm is confined in the valve body above the stem by a bonnet that is screwed into the body. An operating stem is screwed into the bonnet with a convex lower end that engages the top surface of the diaphragm. A hand wheel on the operating stem enables the operating stem to be rotated to screw it up or down, and through this movement to flex the diaphragm, and through the diaphragm move the lower valve stem up or down. A spring around the lower valve stem is confined between a shoulder in the chamber above the valve seat, and a washer near the upper end of the lower valve stem. One common cause of failure of such valves is that the insert at the seating end of the lower valve stem drops out, and jams the valve from closing, while another source of failure is from over-stressing the diaphragm or diaphragm failure by concentration of the turning action of the upper valve stem and the pressure on a small area of the diaphragm.

The present invention is for an improvement in valves of this type designed to simplify the construction of such valves, while reducing the possibility of failure. This is accomplished by so constructing the lower valve stem of plastic in such manner as to avoid any insert between the part that is moved by the action of the spring and the sealing end of the stem.

My invention may be understood by reference to the accompanying drawing, in which.

Figure 1:
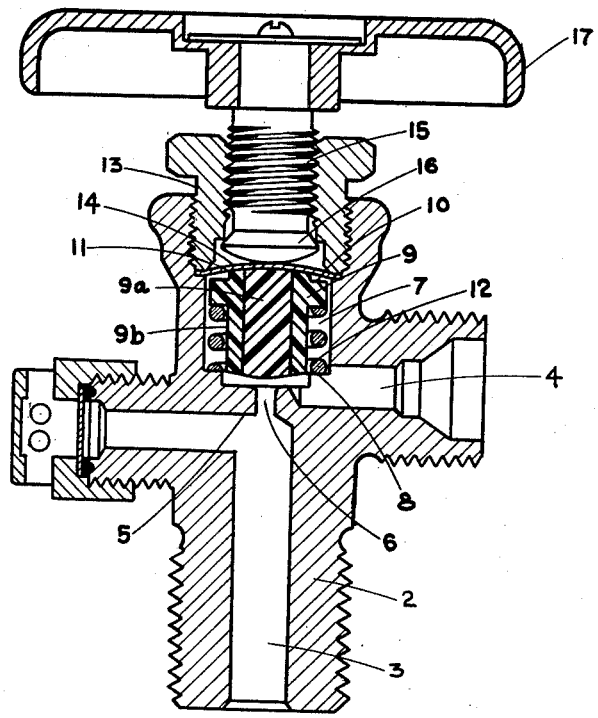
Fig. 1 is a vertical section through a valve embodying my invention.
Figure 2:
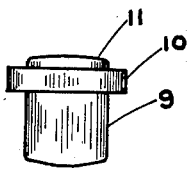
Fig. 2 is an elevation of the lower valve stem piece removed from the valve.

In the drawings, 2 designates a metal valve body of any suitable type having an inlet passage 3 and an outlet passage 4. A partition 5 separates the two passages, and it is provided with a port 6 therethrough, while the top of the partition, instead of having a raised valve seat, is flat, the top edge of the port where it merges into the table being rounded. In the valve body above the partition 5 there is a valve chamber 7 with the bottom of the valve chamber being of reduced diameter to form a shoulder 8.

The lower valve stem assembly or valve element is designated generally as 9. Its exact construction will depend somewhat on the purpose for which the valve is intended. It may be integrally formed of a single piece of hard nylon or other thermoplastic or thermosetting resin. If it is formed of a fabric or fiber-reinforced phenolic resin, it is preferably assembled in two parts and integrated in the process of curing the resin. In this event it has a core 9a which is made of a piece of fiber-reinforced rod around which there is a sleeve 9b constructed similarly to a fiber-reinforced plastic tube, the two parts being integrated by the curing of the resin. While this composite construction is not necessary, particularly where a plastic such as nylon is used, it makes a much stronger member when formed of a phenolic resin when assembled in this manner, because it more effectively resists cracking under compressive forces to which it may be subjected. A cured resin having a Rockwell hardness in the range of M85 to M115 is most desirable for this purpose, and it appears that it should be substantially within this range for high pressure valves, particularly. The choice of resin depends somewhat upon the gas with which the valve is to be used. For example, with oxygen, a phenolic stem is preferable to nylon, since nylon may be subject to some slight oxidation and deterioration in the presence of high pressure oxygen.

The lower stem member 9 has a stem portion which is formed with a slightly conical or flattened conical lower end with the apex of the cone pointed downwardly. There is an integral flange 10 around the plastic stem near the upper end, and above this flange there is preferably a short projection 11, the diameter of which is less than the diameter of the flange, being about equal to that of the stem, and the top surface of which is initially slightly convexed, as shown. In the valve chamber there is a compression spring 12 which is confined between the shoulder 8 in the valve chamber and the flange 10 of the valve stem, and this spring exerts an upward pressure on the valve stem. It will thus be seen that all of that portion of the lower stem from the flange down is integrated, eliminating any need for any insert in the lower stem.

Above the lower valve stem assembly the valve body is of the usual construction, being internally threaded, and an externally threaded bonnet 13 is screwed into the upper end of the valve body in the usual manner. A flexible diaphragm usually made of one or more thicknesses of flexible non-corrosive metal 14 is confined in the valve body between the lower end of the bonnet and an internal shoulder in the valve body in a manner now generally practised. The bonnet has an internally threaded passageway therethrough in which is screwed the upper valve stem or operating member 15 having a lower end portion 16 which is of enlarged diameter, and which is convexed.

A hand wheel 17 is secured to the upper end of the operating valve stem. The diaphragm 14 bears against the top of the lower valve member and the bottom of the part 16 on the operating member. When the operating member is turned in one direction or the other, it is moved up or down, causing the diaphragm to flex and impart rectilinear movement to the lower valve stem assembly while the diaphragm itself prevents any leakage of gas from the valve chamber upwardly around the operating stem.

The diaphragm is initially confined, as in present metal valves, between the convex lower end of the valve operating stem and the convex upper end of the lower valve stem member. Even though I employ the hardest available nylon or phenolic resins in making the lower valve stem member, the great concentration of pressure on the convex upper end results in a slight concavity being produced in the upper convex surface when the valve is tightly closed one or two times. This concavity, after being initially produced, does not progressively deepen, due first to the fact that after initial deformation the resin reaches a density that precludes further deformation, and second, after the concavity develops, the pressure is distributed over a much larger area. I accommodate for this by making the piece initially slightly longer than a corresponding metal member would be formed. This deformation is a desired result, because after it has occurred, the diaphragm ceases to have the wear and pressure concentrated at the point of contact of two convex surfaces, but is confined between self-conformed convex and concave surfaces over an appreciably greater area, thereby reducing rapid wearing through of the diaphragm at the center.

The flange 10 on the valve member 9 is of a diameter such as to have a working fit against the walls of the valve chamber 7, while the lower end of the member 9 is slidably centered in the reduced area of the valve chamber above the partition 5. This arrangement allows the valve member 9 to slide up and down in the valve chamber, but it cannot become cocked sideways. This spring also serves to keep the member 9 centered.

The projection 11 above the flange 10 serves an important function because when the diaphragm is flexed from an upwardly convexed position to a downwardly convexed position it tends to form a wrinkle between the center and the edge of the diaphragm, and the reduced extension on the plastic body above the flange allows this wrinkle to form relatively close to the center of the diaphragm so that stresses in the diaphragm are minimized, which would not be the case if the upper end of the member 9 were not reduced in diameter in the manner described.

The conical lower end of the valve member 9 is centered over the valve port 6, and as the valve member 9 is forced down in closing the valve, the conical surface of the lower end of the member 9 seats against the rounded corner where the edge of the port merges into the flat top of the partition 5. There may be some initial slight distortion of the plastic end of the member 9 when it is forced down onto the top of the partition, but because of the rounded edges around the valve port and the conical shape of the end, the area of contact between the plastic and the metal becomes so great that there will be no further deformation of the plastic, whereas if there were a conventional valve seat as is usually provided in valves of this type, the seat would tend to increasingly indent itself into the plastic, thus gradually increasing the range of movement of the valve to a point where over-flexing of the diaphragm might result, or the valve would not close tightly. A second advantage of the conical end is that if a conventional valve seat were provided and the end of the valve body 9 were square, as is usual in valve of this type, where a metal valve member is used with an insert disk, the compressive forces would all be in the direction of applied pressure, i.e., axially of the direction of movement of the valve stem, increasing the likelihood of the plastic splitting, whereas by having a conical end, some of the stresses are directed radially, thus reducing the tendency of the member 9 to break or split. Additionally, the shape of the end, bearing on the rounded shoulders of the valve port as the valve closes, centers itself always the same, and radial movement provided by the working tolerances or clearance between parts cannot cause seating in different positions, as with conventional valves of this type. A relatively flat conical end assures this self-centering action, without indentation of the end surface to an objectionable extent, as might occur if the terminal were more pointed.

An important advantage of my invention as hereinbefore mentioned is that the valve must always open and close in the required manner, whereas with the conventional valves for high pressure gases, as now used, having an insert in the end of a metal valve member, the insert occasionally becomes loose and drops out of the recess in which it is retained, and then interferes with the closing of the valve so that the valve cannot be shut when required. The use of a plastic valve member as disclosed simplifies the machining of the valve since no seat is required in the valve around the port 6 and washers heretofore required to confine the spring are no longer necessary. Contrary to the expectation that plastic could not be used, tests have shown that it will adequately withstand the compressive strains, even in high pressure valves where the hand wheel may be closed through the use of a lever of some type, and that injury to the valve by overflexing of the diaphragm is reduced.

I claim:

A packless diaphragm valve of the class described having a body with inlet and outlet passages and a partition with a valve port therethrough between the passages, the top of the partition being flat with the top edges of the port being rounded, a valve chamber in the body on the outlet side of the partition, the chamber being of reduced diameter immediately above the partition, with a shoulder in the chamber at the top of that part of the chamber which is of reduced diameter, and a valve element in the valve chamber comprising an integral solid plastic member having a stem which has a working fit in that portion of the chamber which is of reduced diameter, the lower end face of the stem being in the form of a flattened cone centered over the port in the partition, the plastic member having an integral flange having a sliding fit in the chamber above the shoulder, the top of the member being initially convexed for contact with the diaphragm, a diaphragm in the body over the valve chamber, a bonnet sealing the diaphragm in place, and a metal valve operating member threaded in the bonnet having a lower terminal of metal which is convex, said operating member having an upper end extending above the bonnet to which a hand wheel may be attached, the convex top of the plastic member designed to become slightly concave at the center by a plastic flow under pressure encountered when the operating member is moved downwardly and its convex terminal engages the diaphragm and the latter is forced into contact with the central portion of the top of the plastic member and the downward pressure on the diaphragm deforms the central top portion of the plastic member.

References Cited in the file of this patent

UNITED STATES PATENTS

| 2,209,956 | Chase | Aug. 6, 1940 |
| 2,701,119 | Smith | Feb. 1, 1955 |

FOREIGN PATENTS

| 720,836 | Great Britain | of 1954 |